US012665824B2

(12) United States Patent
Mermoud et al.

(10) Patent No.: US 12,665,824 B2
(45) Date of Patent: Jun. 23, 2026

(54) LOCALIZATION OF QoE MODELS TO ACCOUNT FOR USER PREFERENCES AND BIASES

(71) Applicant: Cisco Technology, Inc., San Jose, CA (US)

(72) Inventors: Grégory Mermoud, Venthône (CH); Jean-Philippe Vasseur, Combloux (FR)

(73) Assignee: Cisco Technology, Inc., San Jose, CA (US)

( * ) Notice: Subject to any disclaimer, the term of this patent is extended or adjusted under 35 U.S.C. 154(b) by 528 days.

(21) Appl. No.: 18/096,755

(22) Filed: Jan. 13, 2023

(65) Prior Publication Data

US 2024/0243979 A1 Jul. 18, 2024

(51) Int. Cl.
| | |
|---|---|
| *H04L 12/00* | (2006.01) |
| *H04L 41/16* | (2022.01) |
| *H04L 41/5025* | (2022.01) |
| *H04L 41/5067* | (2022.01) |

(52) U.S. Cl.
CPC .......... H04L 41/5067 (2013.01); H04L 41/16 (2013.01); H04L 41/5025 (2013.01)

(58) Field of Classification Search
CPC . H04L 41/5067; H04L 41/16; H04L 41/5025; H04L 41/147; H04L 41/40; H04L 41/5009; H04L 41/5019
USPC ......................................................... 370/252
See application file for complete search history.

(56) References Cited

U.S. PATENT DOCUMENTS

| | | | | |
|---|---|---|---|---|
| 10,251,178 | B2 | 4/2019 | Franklin et al. | |
| 10,454,989 | B2 | 10/2019 | Ouyang et al. | |
| 10,701,394 | B1 * | 6/2020 | Caballero | .............. G06N 3/045 |
| 10,938,650 | B1 * | 3/2021 | Hermoni | ............. G06F 16/1734 |
| 11,049,040 | B2 * | 6/2021 | Mondal | ................... H04L 65/80 |
| 11,431,781 | B1 | 8/2022 | Carofiglio et al. | |
| 12,255,822 | B2 * | 3/2025 | Mermoud | ........... H04L 43/0876 |
| 12,282,409 | B2 * | 4/2025 | Wu | ........................ H04L 41/142 |
| 12,341,662 | B2 * | 6/2025 | Chong | .............. H04W 28/0992 |
| 2018/0367445 | A1 * | 12/2018 | Bajaj | ...................... H04L 41/142 |
| 2020/0287790 | A1 * | 9/2020 | Srinivas | .................. H04L 43/04 |
| 2021/0083948 | A1 * | 3/2021 | Paruchuri | ........... H04L 47/6215 |

(Continued)

OTHER PUBLICATIONS

Salutari, et al., "Analyzing Wikipedia Users' Perceived Quality of Experience: A Large-Scale Study", IEEE Transactions on Network and Service Management (vol. 17, Issue: 2, Jun. 2020), IEEE.

(Continued)

*Primary Examiner* — Frantz Coby
(74) *Attorney, Agent, or Firm* — Lee & Hayes, P.C.

(57) ABSTRACT

In one embodiment, a device obtains quality of experience metrics specified by a plurality of users of an online application and user information regarding those users. The device identifies, based on the user information, one or more user characteristics of the plurality of users associated with variations in the quality of experience metrics. The device trains a prediction model to predict quality of experience metrics for a subset of the plurality of users based on the one or more user characteristics associated with the subset. The device makes, based on a prediction by the prediction model, an adjustment to a configuration of a network used by the subset to access the online application.

20 Claims, 9 Drawing Sheets

(56)          References Cited

U.S. PATENT DOCUMENTS

| | | | | |
|---|---|---|---|---|
| 2021/0195443 | A1* | 6/2021 | Agarwal | H04L 43/0876 |
| 2022/0338062 | A1* | 10/2022 | Bennett | H04W 48/06 |
| 2023/0019788 | A1* | 1/2023 | Bajaj | H04L 47/2441 |
| 2023/0188455 | A1* | 6/2023 | Vasseur | H04L 41/5009 |
| | | | | 370/229 |
| 2023/0300039 | A1* | 9/2023 | Kersch | H04L 41/0631 |
| | | | | 709/224 |
| 2024/0015104 | A1* | 1/2024 | Schornig | H04L 47/24 |
| 2024/0039856 | A1* | 2/2024 | Kakko-Chiloff | H04L 41/5025 |
| 2024/0146644 | A1* | 5/2024 | Vasseur | H04L 45/302 |

OTHER PUBLICATIONS

"Differential Privacy", online: https://en.wikipedia.org/wiki/Differential_privacy, Dec. 8, 2022, 12 pages, Wikimedia Foundation, Inc.
Wang, et al., "A Data-Driven Architecture for Personalized QoE Management in 5G Wireless Networks", Feb. 2017 IEEE Wireless Communications 24(1):102-110, IEEE Wireless Communications.
Narendra, et al., "Analysis of Location based QoE for Mobile video streaming from YouTube in 4G Networks", Master Thesis, Electrical Engineering, Nov. 2013, School of Computing, Blekinge Institute of Technology, 47 pagesm, Karskrona, Sweden.

* cited by examiner

500

APPLICATION EXPERIENCE OPTIMIZATION PROCESS 248

BIAS ANALYZER 502

QoE MODEL SELECTOR 504

NETWORK ADJUSTER 506

FAIRNESS TRACKER 508

USER INFORMATION 510

QoE METRICS 512

APPLICATION INFORMATION 514

NETWORK METRICS 516

NETWORK ADJUSTMENT 518

LOCALIZATION OF QoE MODELS TO ACCOUNT FOR USER PREFERENCES AND BIASES

TECHNICAL FIELD

The present disclosure relates generally to computer networks, and, more particularly, to the localization of quality of experience (QoE) models to account for user preferences and biases.

BACKGROUND

With the recent evolution of machine learning, predictive failure detection and proactive routing in a network now becomes possible through the use of machine learning techniques. For instance, modeling the delay, jitter, packet loss, etc. for a network path can be used to predict when that path will violate the service level agreement (SLA) of the application and reroute the traffic, in advance. However, doing so is also not without cost, as needlessly rerouting application traffic can also negatively impact the application experience of a user.

Traditionally, SLA thresholds have been used as a proxy for the true quality of experience (QoE) of an online application from the perspective of the end user. In other words, it is assumed that if the SLA is being violated, the QoE of the application is also degraded. While this may hold true in clear situation of network impairment, some of the more complex types of impairments could go unnoticed by network systems because of the specificity of the impairment definition or because of other factors that limit visibility to such impairments. Moreover, such threshold-based mechanisms rely on long-standing phenomena captured by computing aggregate statistics on the network path metrics (e.g. the average delay, etc.), which is far from being able to capture all of the network path states that affect the application QoE in real-life.

While it may be possible now to model the true QoE of an online application, one challenge that still remains relates to the localization of user preferences and biases. Indeed, since QoE is a subjective metric from the standpoint of the end user, different users may have very different expectations. For instance, a user in a country with poor Internet connectivity may have very different expectations than that of a user in a country with widespread access to broadband and fiber.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
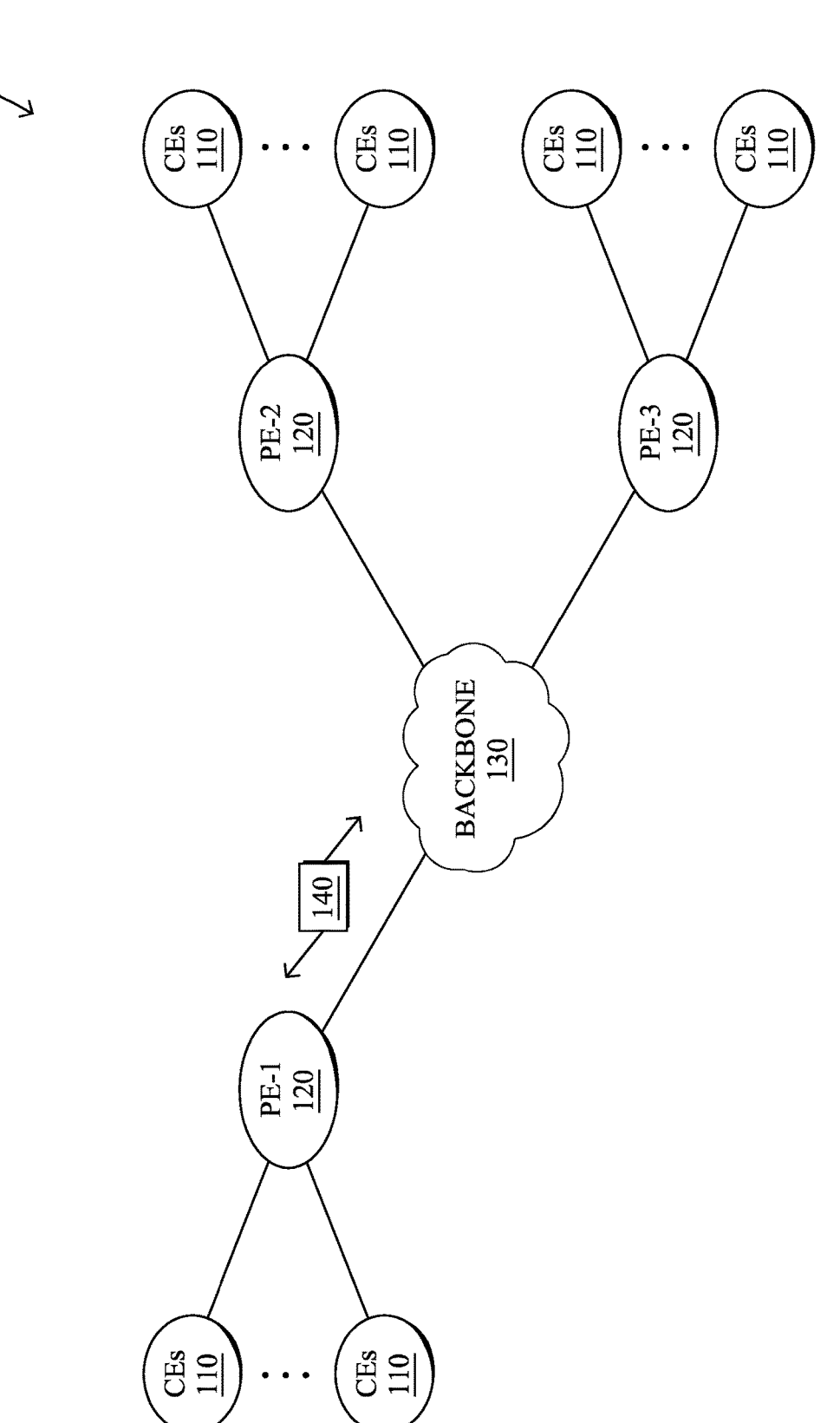
FIGS. 1A-1B illustrate an example communication network.

According to one or more embodiments of the disclosure, a device obtains quality of experience metrics specified by a plurality of users of an online application and user information regarding those users. The device identifies, based on the user information, one or more user characteristics of the plurality of users associated with variations in the quality of experience metrics. The device trains a prediction model to predict quality of experience metrics for a subset of the plurality of users based on the one or more user characteristics associated with the subset. The device makes, based on a prediction by the prediction model, an adjustment to a configuration of a network used by the subset to access the online application.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
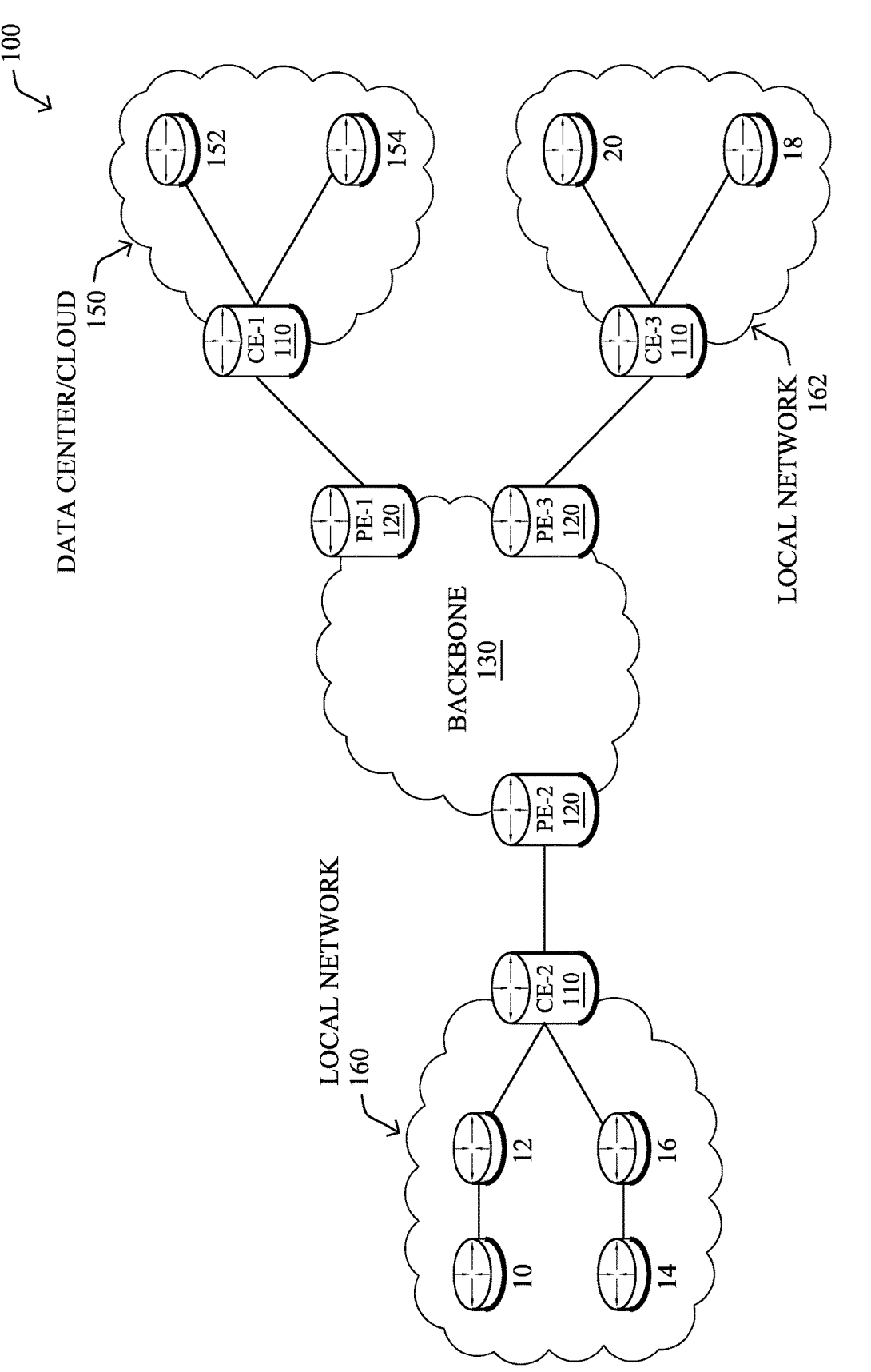

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
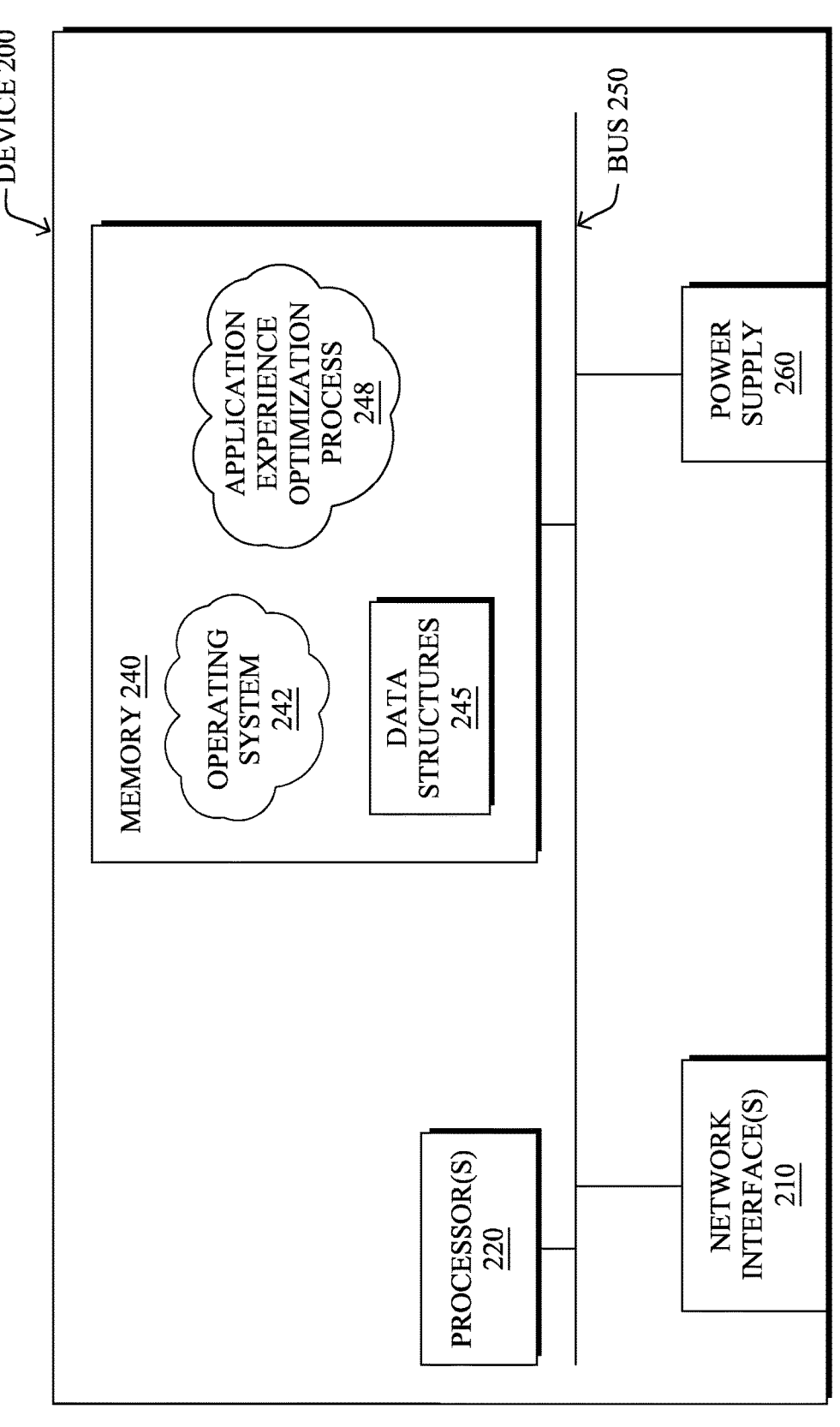
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an application experience optimization process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, application experience optimization process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, application experience optimization process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, application experience optimization process 248 may include computer executable instructions that, when executed by processor(s) 220, cause device 200 to perform the techniques described herein. To do so, in some embodiments, application experience optimization process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, application experience optimization process 248 and/or data denoising process may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that application experience optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
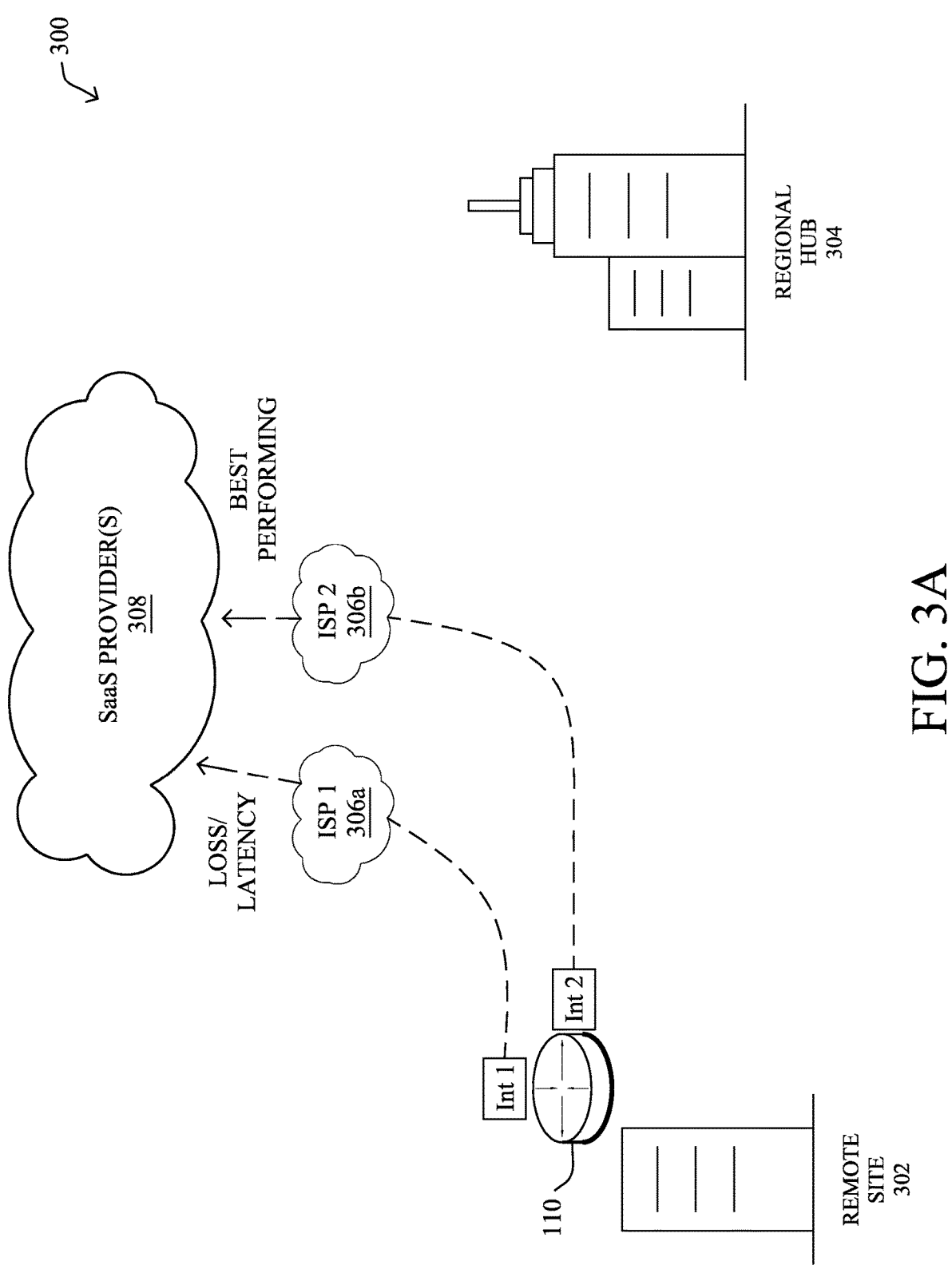
FIGS. 3A-3B illustrate example network deployments.
Figure 3B:

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306_a_, denoted ISP 1 in FIG. 3A. Likewise, a second interface of router 110, Int 2, may establish a backhaul path with SaaS provider(s) 308 via a second ISP 306_b_, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306_b_. In contrast to the example in FIG. 3A, Int 3 of router 110 may establish a third path to SaaS provider(s) 308 via a private corporate network 306_c_ (e.g., an MPLS network) to a private data center or regional hub

304 which, in turn, provides connectivity to SaaS provider(s) 308 via another network, such as a third ISP 306_d_.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
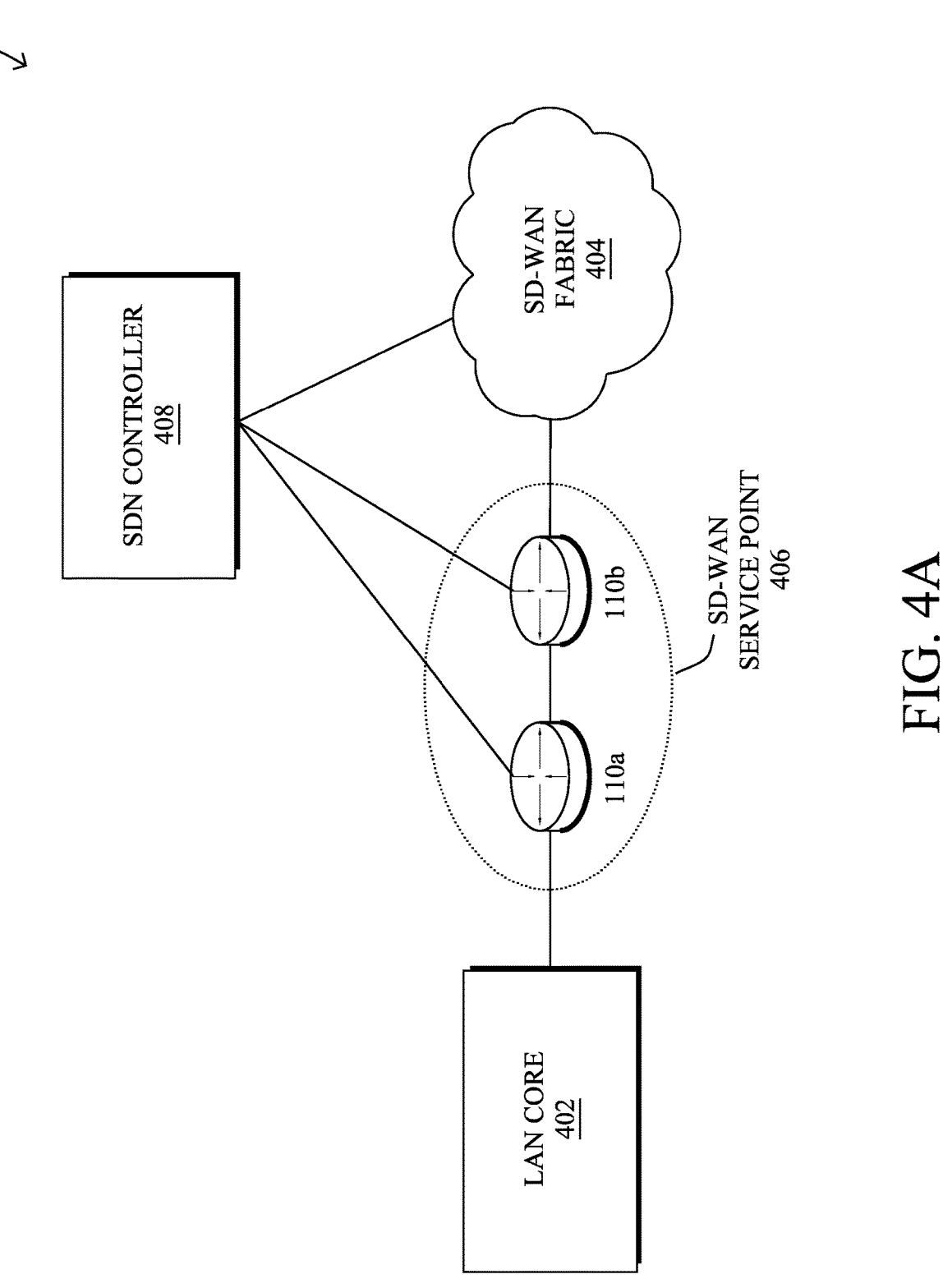
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110_a_-110_b_.

Overseeing the operations of routers 110_a_-110_b_ in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side. SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet. MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
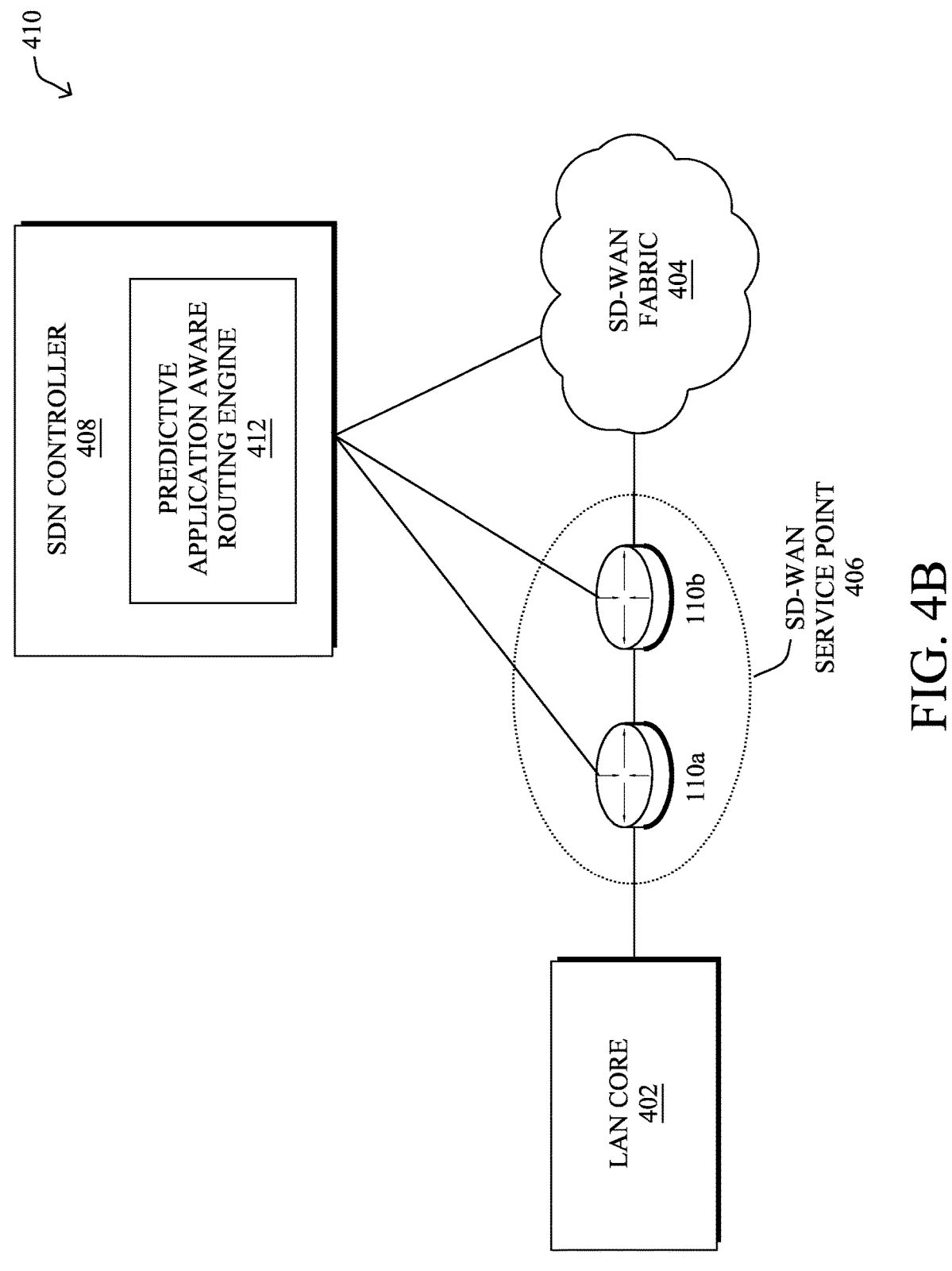

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of application experience optimization process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b. SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, advances in machine learning now make it possible to predict when the QoE of an online application will be degraded, based on the states of the network path(s) via which traffic of the application is conveyed. More specifically, machine learning model can be used to train a model to predict the QoE of an online application based on cross-layer telemetry (e.g., at both the application and network levels) and user feedback regarding their subjective perceptions of their application experiences. In turn, the prediction model can be used to drive configuration changes in the network used to access the online application.

However, testing has revealed that the subjective nature of QoE metrics mans that a one-size-fits-all approach to making predictions does not account for the inherent localization of user preferences and some of the natural biases that arise from differences in the characteristics of the users. For instance, a user located in a country that has poor Internet connectivity may have a very different perception of the QoE of a given application than that of a user located in a country with fiber optic broadband. This means that a prediction model that simply looks to network and application telemetry may perform poorly for certain sets of users.

—Localization of QoE Models to Account for User Preferences and Biases—

The techniques introduced herein allow for the training of QoE prediction models that take into account the user characteristic(s) associated with variations in the QoE metrics from different sets of users. More specifically, a series of mechanisms are introduced herein to identify such user preferences and biases and produce QoE prediction models that take into account these user characteristic(s). In some aspects, this may also be done while making a tradeoff between other influencing factors such as cost, environmental footprint, or the like. For instance, if a given subset of users do not care about video quality (e.g., because they operate on very small devices or in environments where the camera must be turned off, such as hospital rooms), there is no point in provisioning a large amount of bandwidth to optimize for this factor. On the contrary, some users with disabilities might be overly sensitive to delays in interactive workflows or rely on features that other users ignore (e.g., captioning, read-aloud), thus making their assessment of QoE vastly different.

Illustratively, the techniques described herein may be performed by hardware, software, and/or firmware, such as in application experience optimization process 248, which may include computer executable instructions executed by the processor 220 (or independent processor of interfaces 210) to perform functions relating to the techniques described herein.

Specifically, according to various embodiments, a device obtains quality of experience metrics specified by a plurality of users of an online application and user information regarding those users. The device identifies, based on the user information, one or more user characteristics of the plurality of users associated with variations in the quality of experience metrics. The device trains a prediction model to predict quality of experience metrics for a subset of the plurality of users based on the one or more user characteristics associated with the subset. The device makes, based on a prediction by the prediction model, an adjustment to a configuration of a network used by the subset to access the online application.

Figure 5:
FIG. 5 illustrates an example architecture for the localization of quality of experience (QoE) models to account for user preferences and biases.

Operationally, FIG. 5 illustrates an example architecture for the localization of quality of experience (QoE) models to account for user preferences and biases, according to various embodiments. At the core of architecture 500 is application experience optimization process 248, which may be executed by a controller for a network, a networking device, or another device in communication therewith. For instance, application experience optimization process 248 may be executed by a controller for a network (e.g., SDN controller 408 in FIGS. 4A-4B), a particular networking device in the network (e.g., a router, etc.), another device or service in communication therewith, or the like. In some embodiments, for instance, application experience optimization process 248 may be used to implement a predictive application aware routing engine, such as predictive application aware routing engine 412, or another supervisory service for the network. In other embodiments, application experience optimization process 248 may be used to implement a reactive routing approach in the network.

As shown, application experience optimization process 248 may include any or all of the following components: a bias analyzer 502, a QoE model selector 504, a network adjuster 506, and/or a fairness tracker 508. As would be appreciated, the functionalities of these components may be combined or omitted, as desired (e.g., implemented as part of application experience optimization process 248). In addition, these components may be implemented on a singular device or in a distributed manner, in which case the combination of executing devices can be viewed as their own singular device for purposes of executing application experience optimization process 248.

During execution, application experience optimization process 248 may operate in conjunction with any number of telemetry collection mechanisms, to obtain various information, such as user information 510, QoE metrics 512, application information 514, and/or network metrics 516. As detailed below, such telemetry collection mechanisms may include, but are not limited to, network path probing mechanisms, user account information, QoE collection/surveying mechanisms, the online applications themselves (e.g., via application programming interfaces of the applications), and the like.

In general, user information 510 may include any information about the plurality of users of an online application. For instance, user information 510 may be available from a human resources (HR) service, account information from the online application, network account information, combinations thereof, or the like. In various embodiments, user information 510 may include any or all of the following:

Location information for the user (e.g., the city, zip code, metropolitan area, country, etc.).

Language information for the user.

Demographic information for the user (e.g., nationality, gender, race, orientation, etc.).

Disabilities of the user (e.g., physical handicaps, learning or cognitive disabilities, etc.).

Domain knowledge of the user (e.g., the industry in which the user works, the position of the user in an organization, etc.).

Any other user information that could potentially affect the perception of the user regarding the QoE of the application.

QoE metrics 512 may take the form of any information indicative of the subjective perceptions of the quality of experience of the various users associated with user information 510. For instance, QoE metrics 512 may take the form of continuous numbers or discrete values (e.g., 'good' 'bad,' 'no opinion,' etc.), or multiple such metrics. Examples of such QoE metrics may also include metrics based on satisfaction ratings provided by users of the application, such as by having the users complete satisfaction surveys during or after their application sessions. Such surveys may be presented either via a local agent or directly within the application itself.

Application information 514 may include any telemetry data available from the online application that could be used to predict the QoE metrics of its users. For instance, application information 514 may include concealment times, mean opinion score (MOS) information, or other such application-level information.

Network metrics 516 may generally include any network-level telemetry data that could be used to predict the QoE metrics for users of the online application. For instance, network metrics 516 may include path metrics regarding the various network paths (e.g., DIA paths, tunnels, etc.) used to access the online application. For instance, network metrics 516 may be obtained by sending probes along the various paths/tunnels, such as Bidirectional Forwarding Detection (BFD) or CXP probes, that indicate path metrics such as loss, latency, jitter, throughput, etc. Netflow or IPFIX records represent another potential source of network metrics 516. In addition, network metrics 516 may also include state information for the various networking devices (e.g., queue states, hardware resources, etc.) associated with those network paths.

According to various embodiments, bias analyzer 502 may be configured to identify biases/preferences in the application experience of a wide variety of users of the online application. To this end, bias analyzer 502 may employ statistical analysis to identify whether one or more user characteristics such as their role, their country of residence, etc. are significantly biasing their assessment of their application experience (e.g., their associated QoE metrics 512). In other words, bias analyzer 502 may seek identify, based on user information 510 and QoE metrics 512, one or more user characteristics of the plurality of users associated with variations in their reported QoE metrics 512.

In some embodiments, bias analyzer 502 may also control for other attributes (e.g., application information 514, network metrics 516, etc.) such that a precise assessment can be made of the user characteristics. For instance, upon comparing the assessment of users in India and the United States of America, bias analyzer 502 may ensure the network conditions of both samples are comparable in their distribution, such that the differences in QoE come indeed from the country of residence, and not from the poorer network conditions.

By way of example, different subsets of the application may have different domain knowledge (e.g., software engineers vs. medical practitioners), which can heavily influence their subjective QoE metrics 512. Similarly, individual preferences such as whether the user prefers text or a more visual interface could also affect their QoE metrics 512. In yet another example, the "usual" experience of users located in a country with poor Internet connectivity may have very different expectations than users in other countries that have widespread use of broadband and fiber.

In various embodiments, once bias analyzer 502 has identified one or more user characteristics associated with variations in QoE metrics 512 (e.g., based on their correlations, etc.), bias analyzer 502 may then train a QoE prediction model to predict QOE metrics for a subset of the plurality of users based on the one or more user characteristics associated with the subset. In one embodiment, bias analyzer 502 may do so by training separate QoE prediction models for the different subsets/cohorts of users (e.g., those located in India, those located in the U.S., etc.). In another embodiment, bias analyzer 502 may instead incorporate those user characteristic(s) as one or more input features of the QoE prediction model, such that it can learn the influence of the user characteristic(s), directly.

It should be noted that the approach of incorporating the identified user characteristic(s) as input feature(s) of the QoE prediction model has the advantage of being more flexible, and it is more amenable to situations where the number of labels is limited. Indeed, training a model on a smaller cohort can cause its overall accuracy to decrease due to having fewer labels on which it may be trained.

In various embodiments, QoE model selector 504 may be configured to use the resulting model from bias analyzer 502 to perform QoE predictions that account for the user biases. To this end, QoE model selector 504 may maintain a database of user characteristics mapped to different sites of the network. In turn, QoE model selector 504 may then either select the appropriate model (e.g., if bias analyzer 502 trains separate QoE models) or augment the input feature(s) of the QoE model (e.g., if bias analyzer 502 incorporate the identified user characteristics into the QoE model), accordingly.

In some embodiments, QoE model selector 504 may also be responsible for surveying selected users to validate whether the actions by bias analyzer 502 have an effect on the performance of the QoE prediction model. For instance, if such surveys indicate with confidence that the differentiation is not required, then the different cohorts/subsets of users may be merged back into a singular model, the model fine-tuned with new labels, or the feature(s) removed altogether.

Importantly, some of the user characteristics indicated by user information 510 may be highly confidential (e.g., disabilities, gender), but the techniques herein do not require individual details, but only summaries. Thus, user information 510 may be highly summarized or, more appropriately, made provably private, such as through the use of differential privacy techniques.

In various embodiments, network adjuster 506 may be configured to take corrective actions based on the QoE predictions, such as by making an adjustment 518 to a configuration of the network. Note that adjustment 518 may be made either directly (e.g., by sending an instruction to a networking device) or indirectly, such as by suggesting the configuration change to an operator of the network. Regardless, adjustment 518 may also include an indication that it accounts for user preference or bias, as well. For instance, the system may suggest a cost-saving action for a site where very few users care about video quality, as they use Webex only for voice. Conversely, there might be instructions to provision more bandwidth in a highly sensitive branch that requires low latencies on collaboration tools for UX design.

In some embodiments, application experience optimization process 248 may also include fairness tracker 508, which is used to track a measure of fairness associated with any automated actions taken by network adjuster 506. Indeed, application experience optimization process 248 may automatically discover biases triggering the training of specific models that will in turn be used to drive the network configuration. More specifically, fairness tracker 508 may seek to identify a root cause of the QoE variations associated with the identified user characteristic(s), be it cultural in nature, network-related, or the like.

By way of example, a user in a given location with "reduced" network may tend to be less sensitive to bandwidth because of their experience. Consequently, application experience optimization process 248 may leverage fairness tracker 508 to optimize the network without trying to allocate more bandwidth leading to a "lack of fairness" with users that would be more sensitive to bandwidth. More specifically, fairness tracker 508 may check whether the low importance of "bandwidth" to those users is driven by a cultural effect or the fact that bandwidth has not been available in each region. Such a check could be performed, for instance, by checking parameters with high importance trained in other regions and trying to check the impact on QoE (when possible) in the region.

Figure 6:
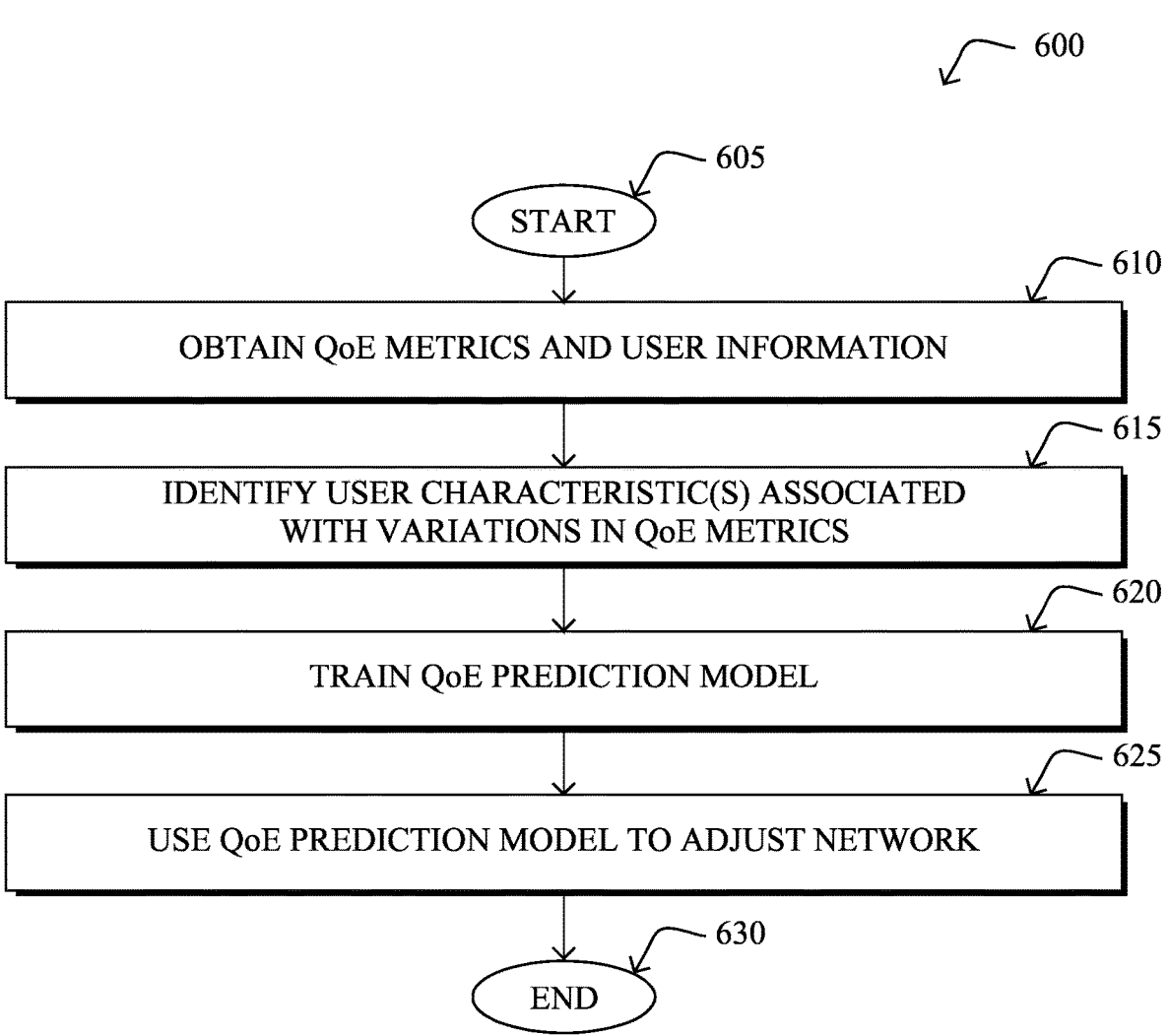
FIG. 6 illustrates an example simplified procedure for the localization of quality of experience (QoE) models to account for user preferences and biases.

FIG. 6 illustrates an example simplified procedure 600 (e.g., a method) for the localization of quality of experience (QoE) models to account for user preferences and biases, in accordance with one or more embodiments described herein. For example, a non-generic, specifically configured device (e.g., device 200), such as controller for a network (e.g., an SDN controller, a cloud-based device, etc.), an edge router, or other device in communication therewith, may perform procedure 600 by executing stored instructions (e.g., application experience optimization process 248). The procedure 600 may start at step 605, and continues to step 610, where, as described in greater detail above, the device may obtain QoE metrics specified by a plurality of users of an online application and user information regarding those users. In some embodiments, the QoE metrics are based on satisfaction ratings provided by the plurality of users regarding the online application. In various embodiments, the one or more user characteristics are indicative of at least one of: a location of users in the subset, a demographic of users in the subset, or domain knowledge of users in the subset. In some embodiments, the device obtains the QoE metrics via an application programming interface (API) of the online application.

At step 615, as detailed above, the device may identify, based on the user information, one or more user characteristics of the plurality of users associated with variations in the QoE metrics. To do so, the device may perform statistical analysis on the QoE metrics and various user characteristics for the plurality of users, to determine whether any are correlated with variations in the QoE metrics from the users.

At step 620, the device may train a prediction model to predict QoE metrics for a subset of the plurality of users based on the one or more user characteristics associated with the subset, as described in greater detail above. In some embodiments, the device may do so by training separate QoE prediction models for the different subsets of users. In other embodiments, the device may incorporate the identified user characteristic(s) as one or more input features of the QoE prediction model.

At step 625, as detailed above, the device may make, based on a prediction by the prediction model, an adjustment to a configuration of a network used by the subset to access the online application. In one embodiment, the device may do so by adjusting a service level agreement associated with the online application. In another embodiment, the device may do so by provisioning a new connectivity option or network resources for users in the subset (e.g., bandwidth, etc.). In further embodiments, the device may also obtain survey data from a selection of users in the subset indicative of whether they believe the prediction model was able to correctly predict their quality of experience metrics for the online application. In addition, the device may also make a determination as to whether the prediction model should be based on the one or more user characteristics, in view of the survey data. In further embodiments, the device may also determine a root cause for the variations in the quality of experience metrics for the subset, wherein the adjustment to the network is based in part on the root cause. For instance, the root cause may comprise a cultural effect associated with the subset.

Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for the localization of quality of experience (QoE) models to account for user preferences and biases, it is to be understood that various other adaptations and modifications may be made within the spirit and scope of the embodiments herein. For example, while certain embodiments are described herein with respect to using certain models for purposes of predicting application experience metrics, application QoE, disruptions in a network, etc., the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   obtaining, by a device, quality of experience metrics specified by a plurality of users of an online application and user information regarding those users;
   identifying, by the device and based on the user information, one or more user characteristics of the plurality of users that characterize the users and that are associated with variations in the quality of experience metrics, the one or more user characteristics being indicative of at least one of: a location of users in a subset of the plurality of users, a demographic of users in the subset, or an expertise profile of users in the subset;
   training, by the device, a prediction model to predict quality of experience metrics for the subset based on the one or more user characteristics associated with the subset; and
   making, by the device and based on a prediction by the prediction model, an adjustment to a configuration of a network used by the subset to access the online application.

2. The method as in claim 1, wherein the quality of experience metrics are based on satisfaction ratings provided by the plurality of users regarding the online application.

3. The method as in claim 1, wherein making the adjustment to the configuration of the network comprises:
   adjusting a service level agreement associated with the online application.

4. The method as in claim 1, wherein making the adjustment to the configuration of the network comprises:
   provisioning a new connectivity option or network resources for users in the subset.

5. The method as in claim 1, further comprising:
   computing, by the device, a fairness metric that measures disparities in predicted quality of experience metrics between different subsets of the plurality of users defined by different user characteristics, wherein making the adjustment to the configuration of the network is based at least in part on the fairness metric.

6. The method as in claim 1, wherein the device obtains the quality of experience metrics via an application programming interface of the online application.

7. The method as in claim 1, further comprising:
   obtaining, by the device, survey data from a selection of users in the subset indicative of whether they believe the prediction model was able to correctly predict their quality of experience metrics for the online application.

8. The method as in claim 7, further comprising:
   making, by the device, a determination as to whether the prediction model should be based on the one or more user characteristics, in view of the survey data.

9. The method as in claim 1, further comprising:
   determining, by the device, a root cause for the variations in the quality of experience metrics for the subset, wherein the adjustment to the network is based in part on the root cause.

10. The method as in claim 9, wherein the root cause comprises a cultural effect associated with the subset.

11. An apparatus, comprising:

one or more network interfaces;

a processor coupled to the one or more network interfaces and configured to execute one or more processes; and a memory configured to store a process that is executable by the processor, the process when executed configured to:

obtain quality of experience metrics specified by a plurality of users of an online application and user information regarding those users;

identify, based on the user information, one or more user characteristics of the plurality of users that characterize the users and that are associated with variations in the quality of experience metrics, the one or more user characteristics being indicative of at least one of: a location of users in a subset of the plurality of users, a demographic of users in the subset, or an expertise profile of users in the subset;

train a prediction model to predict quality of experience metrics for the subset based on the one or more user characteristics associated with the subset; and make, based on a prediction by the prediction model, an adjustment to a configuration of a network used by the subset to access the online application.

12. The apparatus as in claim 11, wherein the quality of experience metrics are based on satisfaction ratings provided by the plurality of users regarding the online application.

13. The apparatus as in claim 11, wherein the apparatus makes the adjustment to the configuration of the network by:

adjusting a service level agreement associated with the online application.

14. The apparatus as in claim 11, wherein the apparatus makes the adjustment to the configuration of the network by:

provisioning a new connectivity option or network resources for users in the subset.

15. The apparatus as in claim 11, wherein wherein the expertise profile includes information about one or more of an industry in which a user works or a position of the user within an organization.

16. The apparatus as in claim 11, wherein the apparatus obtains the quality of experience metrics via an application programming interface of the online application.

17. The apparatus as in claim 11, wherein the process when executed is further configured to:

obtain survey data from a selection of users in the subset indicative of whether they believe the prediction model was able to correctly predict their quality of experience metrics for the online application.

18. The apparatus as in claim 17, further comprising: wherein the process when executed is further configured to:

making a determination as to whether the prediction model should be based on the one or more user characteristics, in view of the survey data.

19. The apparatus as in claim 11, wherein the process when executed is further configured to:

determine a root cause for the variations in the quality of experience metrics for the subset, wherein the adjustment to the network is based in part on the root cause.

20. A tangible, non-transitory, computer-readable medium storing program instructions that cause a device to execute a process comprising:

obtaining, by the device, quality of experience metrics specified by a plurality of users of an online application and user information regarding those users;

identifying, by the device and based on the user information, one or more user characteristics of the plurality of users that characterize the users and that are associated with variations in the quality of experience metrics, the one or more user characteristics being indicative of at least one of: a location of users in a subset of the plurality of users, a demographic of users in the subset, or an expertise profile of users in the subset;

training, by the device, a prediction model to predict quality of experience metrics for the subset based on the one or more user characteristics associated with the subset; and making, by the device and based on a prediction by the prediction model, an adjustment to a configuration of a network used by the subset to access the online application.

* * * * *